United States Patent Office 3,438,399
Patented Apr. 15, 1969

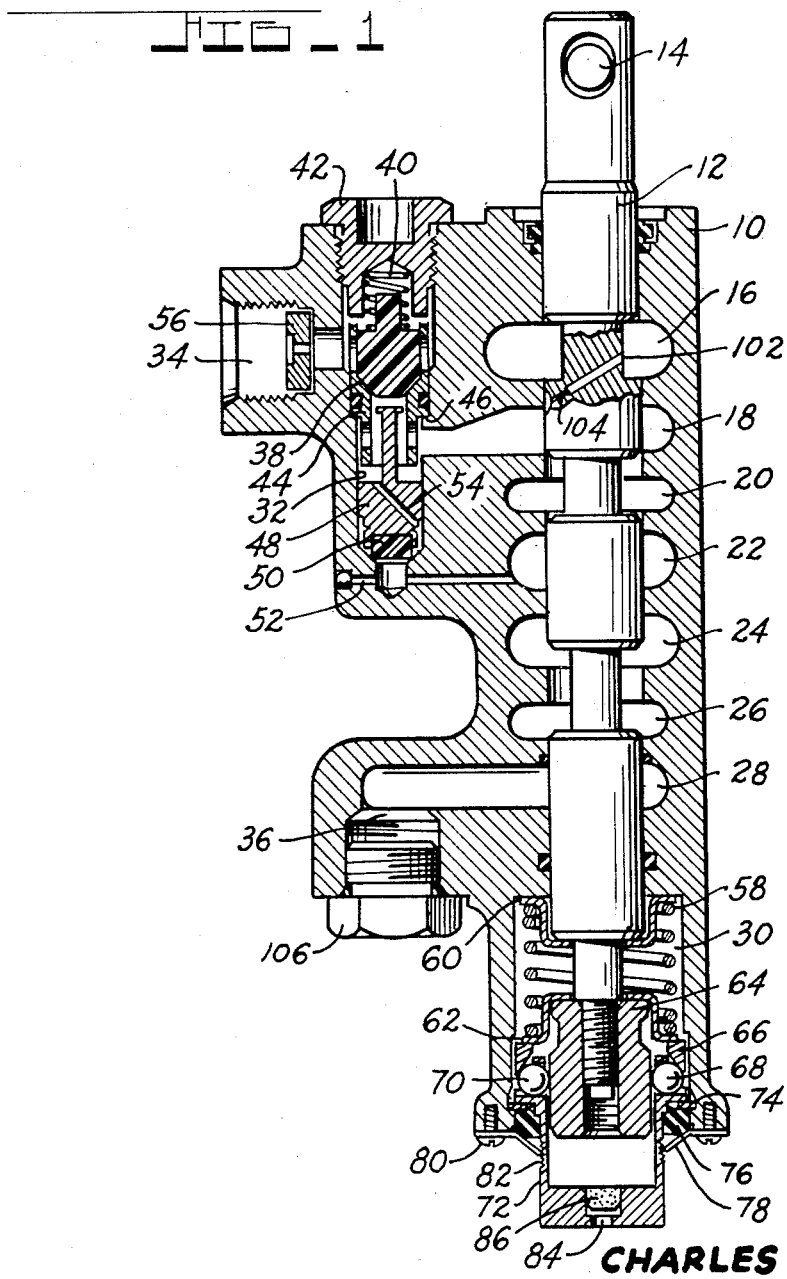

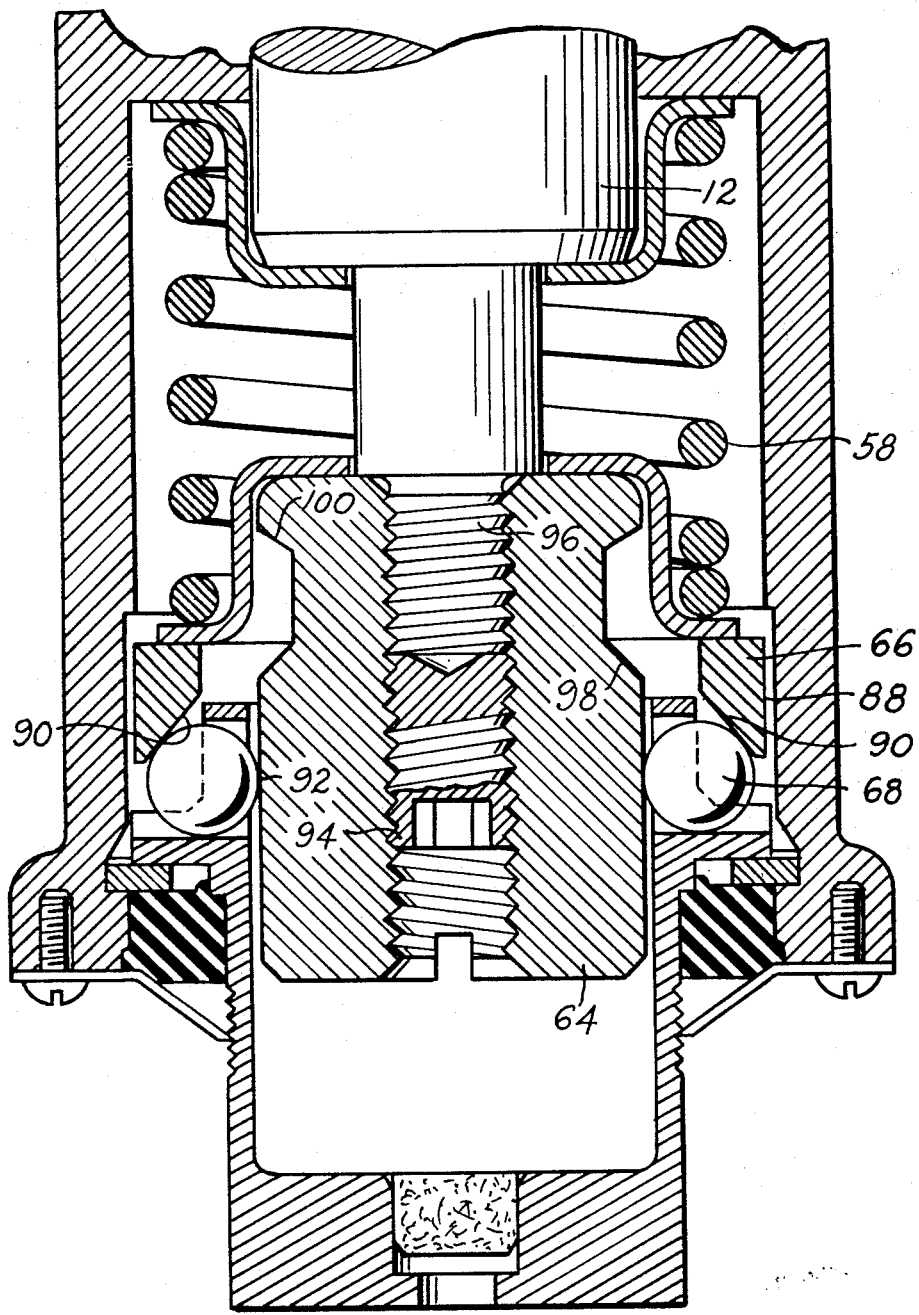
FIG_2

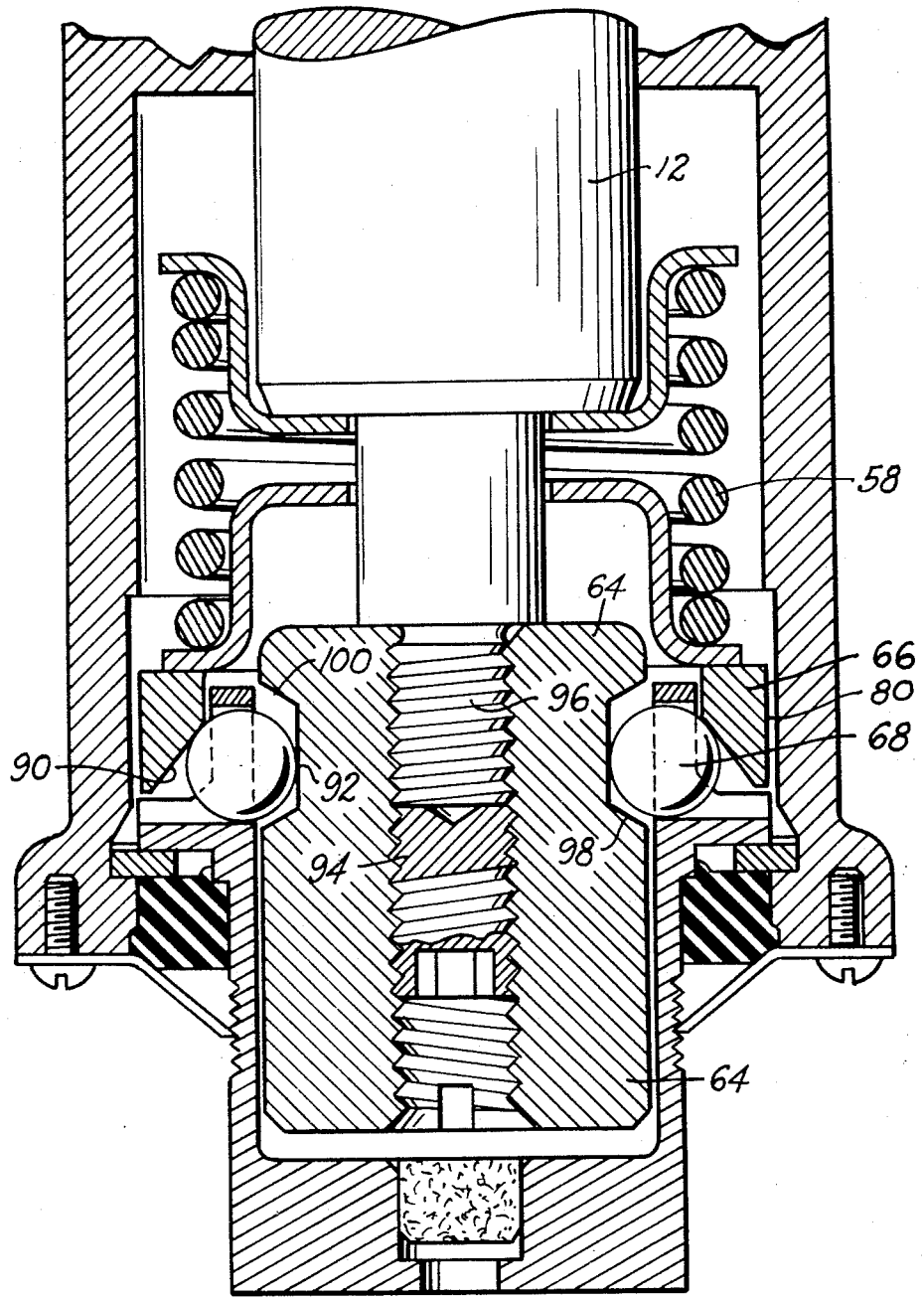

3,438,399
VALVE LOCKING MEANS
Charles M. Barnes and Richard L. Lewis, St. Joseph, Mich., assignors to The Bendix Corporation, a corporation of Delaware
Filed Apr. 24, 1967, Ser. No. 633,215
Int. Cl. F16k 3/26
U.S. Cl. 137—625.69                                    8 Claims

ABSTRACT OF THE DISCLOSURE

A spring biased locking means for a valve utilizing a valve spring to provide a biasing force upon the locking means to force locking elements into detents of a member affixed to or integral with the valve upon movement of the valve to a position where the detents underlie the locking elements.

Summary

Valve locking means are generally known to the prior art. However, the principles of this invention provide less operating force tolerance for detent type valve locking means than other prior art designs. Furthermore, higher locking forces can be obtained with a locking means of this invention than is obtained for given hardware space limitation with commercial tolerances.

It is a primary purpose of this locking arrangement to use the confined valve centering spring as the locking spring to allow compactness of the design and allow reasonable tolerances on the piece parts. An attendant advantage is also that the spring for the locking elements is axially aligned and concentric with the valve while at the same time providing radial action for the locking elements.

Drawing description

FIGURE 1 is a cross sectional side view of a valve means incorporating a locking device in accordance with the principles of this invention;

FIGURE 2 is an enlarged cross sectional view of the locking elements in their released condition as seen in FIGURE 1; and FIGURE 3 is an enlarged cross sectional view of the locking elements in their locked position for the valve as seen in FIGURE 1.

Detailed description

With regard now to FIGURE 1, there is shown a valve housing 10 within which a spool valve 12 is reciprocably operable by the attachment, as at 14, of a manually controlled device (not shown). The valve housing is machined to have a plurality of grooves 16, 18, 20, 22, 24, 26 and 28 as well as a detent chamber 30. In addition, the valve housing 10 is bored, as at 32, and provided with outlet ports 34 and 36.

Within the bore 32 a check valve 38 is assembled to be biased by a spring 40 between a plug 42 and the check valve to abut a valve seat of a sleeve 44 held against a shoulder 46 of the bore 32 upon assembly of the plug 42 to the bore. A piston 48 having a resilent seat 50 is also assembled in the bore 32 to underlie the check valve assembly aforementioned, and a passage 52 is cross drilled between the groove 22 and the lowermost end of the bore 32. A cross drilled passage 54 is provided in the piston 48 to communicate the pressure on one face of the piston to the other face thereof. Finally, with regard to this check valve assembly, an orificed plate 56 is provided in the outlet port 34.

Within the detent chamber 30 a valve centering spring 58 is caged between a retainer 60 abuttingly connected to the spool valve 12 and a retainer 62 also abuttingly connected to the spool valve 12 via a sleeve 64 threaded thereto. The retainer 62 is provided with a radial flange that abuts a ring 66 that is operatively associated with balls 68 and 70 carried within a plug 72. The plug 72 is assembled to the valve housing 10 by inserting it within the detent chamber 30 and thereafter placing a snap ring 74 within a groove in the housing 10. Immediately underlying the snap ring 74 a seal 76 is provided and a retaining plate 78 is held to the housing by means of bolts 80 to maintain the seal in its proper place. This plate 78 is also provided with means to grip serrations 82 of the plug 72 arranged to preclude it from moving away from the snap ring 74. This plug 72 is provided with an atmospheric vent 84 in which a filtering media 86 is arranged to prevent contaminants from entering the detent chamber 30 as well as allowing any leakage of fluid pressure that has passed by the spool valve 12 to the detent chamber 30 to exhaust to the surrounding atmosphere.

As can be seen from the enlarged detail of the locking mechanism of FIGURE 2, the ring 66 is provided with an axial surface 88 about its periphery so that it may slide with respect to the inner walls of the housing 10, and a wedge or angled surface 90 for operative connection with the balls 68.

With reference now to FIGURE 3 it is seen that upon the movement of the spool valve 12 to a position wherein detents 92 formed in the sleeve 64 underlie the balls 68, that the wedge ring 66 will, because of the force of the centering spring 58, force the balls 68 into the detents to hold the valve spool 12 in this actuated position. A threaded plug 94 locks the sleeve 64 onto the threaded end 96 of the spool valve 12. The detents 92 are formed by providing ramp surfaces 98 and 100 whose angles are preferably chosen to be greater than the wedge surface 90 of the ring 66.

Operation

In operation, the manual actuating device will move the spool valve 12 either upwardly or downwardly with respect to the attitude of the valve housing 10 as seen in FIGURE 1. Moving it upwardly will communicate control pressure that is always existing in groove 20 to the groove 18 whereby it will force the check valve 38 off the seat of the sleeve 44 and remove the orifice plate 56 about the opening leading to the outlet port 34 so that control pressure may be exhausted from the valve. Since spool valves are notoriously known for their leaking, a cross drilled passage 102 communicates the groove 18 to the return groove 16, and this passage is provided with a restricted orifice 104 to control the amount of leakage fluid being exhausted thereby. When the desired pressure is reached in the outlet port 34, the check valve 38 will close the communication of the groove 18 with the outlet 34.

Upon moving the spool valve 12 inwardly with respect to the housing 10, the control pressure groove 20 will be communicated to the groove 22 and via the cross drilled passage 52 to the resilient valve seat 50 of the piston 48 to move the piston 48 upwardly to unseat the check valve 38 and permit the fluid from the outlet port 34 to flow back to groove 18 and, as groove 18 is also open now to groove 16, to the reservoir (not shown) for the returning fluid.

At the same time control pressure is existing in groove 26, and because of the inward movement of the spool valve 12, it is communicated to the groove 28 and to the outlet port 36 via the fitting 106 to a controllable actuator (not shown).

This inward movement of the valve 12 will compress the spring 58 which has been installed in a preloaded condition, and cause the sleeve 64 to move to a position whereby the detents 92 underlie the balls 68, which in a preferred construction consist of three balls equidistantly spaced about the plug 72 and aligned with the three detents also equidistantly spaced about the sleeve 64. Upon the balls 68 and/or 70 being forced inwardly by the ring 66 to the detents 92, the valve 12 is held in this condition until a force sufficient to force the balls 68 and 70 to climb the ramp surfaces 98 of the sleeve 64 is provided. The angle of these ramps 98 and 100 is chosen to be greater than the angle of the wedge surface 90 of the ring 66. This angle differential will permit one to control the force required to unlock the valve.

Having fully described an operative construction utilizing the principles of our invention, it is now desired to set forth the intended protection sought by these Letters Patent in the following claims.

We claim:
1. A valve mechanism comprising:
   a housing;
   a valve member in said housing;
   a spring means operatively arranged between said housing and said valve member to center said valve member in said housing; and
   a radially acting locking means operatively connected to said valve member and said spring means having one member moved by said valve member and another member actuated by the axial force of said spring means to hold said valve member in an actuated position.

2. A valve mechanism according to claim 1 wherein said one member is a sleeve connected to said valve member, said sleeve having a locking recess.

3. A valve mechanism according to claim 2 wherein said another member is a ball retained by a plug connected to said housing.

4. A valve mechanism according to claim 3 wherein the operative connection between the spring means and the ball is by a spring retainer operatively connected to said sleeve and a ring operatively connected between said spring retainer and said ball, said ring having a wedge shape profile to force said ball inwardly of said plug and into said recess when aligned therewith.

5. A locking device for a valve comprising:
   a sleeve having a detent at one end, said sleeve being operatively connected to the valve to move therewith, said sleeve also providing an abutment for one end of a valve centering spring which is installed in a preloaded condition between a housing for said valve and said sleeve;
   a plug slidably receiving said sleeve, said plug having at least one ball carried thereby between the housing and said sleeve and normally overlying the end of said sleeve opposite that having said detent; and
   wedge means operatively connected to said valve centering spring and said ball and slidable along said ball under pressure from said spring to force said ball inwardly when aligned with said detent.

6. A locking device according to claim 5 wherein the ramp angle of surfaces of the sleeve leading into the inner surface of the detent are greater than the angle of the surface of the wedge forcing said ball inwardly.

7. A locking device according to claim 5 wherein said sleeve is formed with three equidistantly spaced detents, said plug has three equidistantly spaced balls aligned radially with said detents, and said wedge means is an annular ring having an axial periphery and an angular surface about its central opening such that it can force said balls inwardly simultaneously as said detents move to underlie them as caused by operation of said valve.

8. A locking device according to claim 7 and further comprising a filtering media in an atmospheric vent of the plug precluding pressure locking of said valve and the entry of contaminants into the detent chamber of the housing which would affect operation of the locking device.

References Cited
UNITED STATES PATENTS
3,182,729    5/1965    Carlin et al. ___ 137—625.69 XR M. CARY NELSON, *Primary Examiner.*

R. J. MILLER, *Assistant Examiner.*

U.S. Cl. X.R.

251—297